2,967,013
DIFFUSER

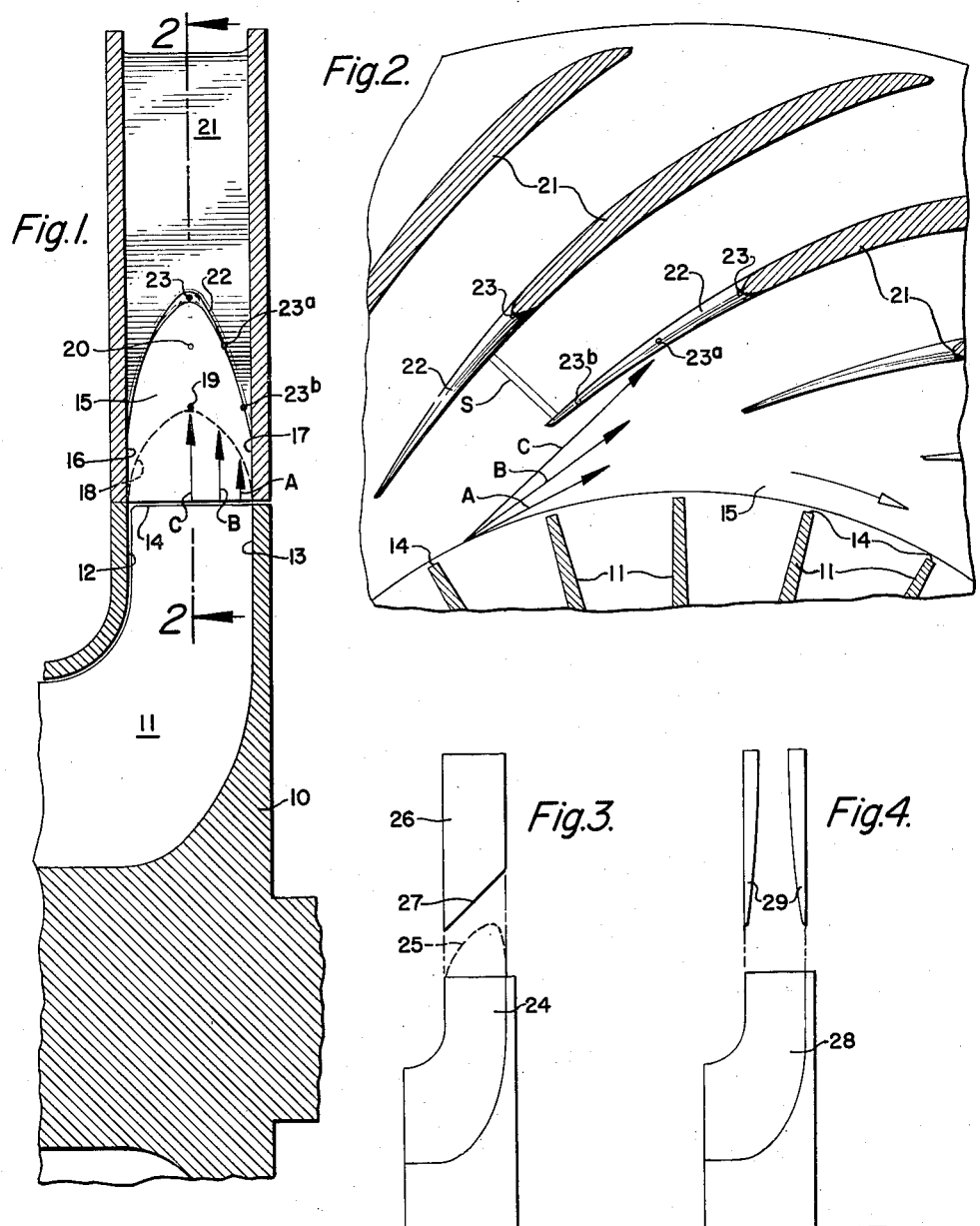
Jan. 3, 1961    F. DALLENBACH ET AL    2,967,013
DIFFUSER
Filed Oct. 18, 1954
INVENTORS
FREDERICK DALLENBACH
HANS P. EICHENBERGER
EUGEN M. KNOERNSCHILD AND
NGUYEN VAN LE
BY   JOHN H. G. WALLACE

United States Patent Office 2,967,013
Patented Jan. 3, 1961

Frederick Dallenbach, Phoenix, Ariz., Hans P. Eichenberger, Cleveland, Ohio, Eugen M. Knoernschild, Los Angeles, Calif., and Nguyen Van Le, Phoenix, Ariz.; said Dallenbach assignor to The Garrett Corporation, Los Angeles, Calif., a corporation of California Filed Oct. 18, 1954, Ser. No. 462,840

4 Claims. (Cl. 230—127)

The present invention relates to a diffuser and more particularly to a diffuser capable of operating efficiently, without the formation of compression shock waves, when flow therethrough decelerates from supersonic to subsonic velocities.

Conventional vaned diffusers, when subjected to supersonic flow therethrough, cause shock waves to extend across the flow passages therein whereby flow is disrupted to the extent of greatly lowering diffuser efficiency.

It is an object of the present invention to provide a vaned diffuser which will operate efficiently when flow therethrough decelerates from supersonic to subsonic velocities without the formation of compression shock waves.

Another object of the invention is to provide a diffuser which is particularly adapted to cooperate with a supersonic compressor.

Another object of the invention is to provide a supersonic compressor having a vaned diffuser wherein the leading edges of the vanes are relieved in a manner corresponding to a distribution of flow velocities leaving the compressor, whereby efficient diffusion of compressor output flow is accomplished in the region of transonic flow through the diffuser.

A further object of the invention is to provide a compressor having a very simple diffuser means capable of operating efficiently when subjected to supersonic, transonic and subsonic flow therethrough.

The foregoing and additional objects of the invention will be apparent from the following specification, appended claims, and accompanying drawing, in which:

Fig. 1 is a fragmentary axial sectional view of a radial compressor and diffuser showing by broken lines a distribution of flow velocities leaving the compressor;

Fig. 2 is a fragmentary sectional view taken from a line 2—2 of Fig. 1;

Fig. 3 is a diagrammatic view showing a modification of the present invention; and Fig. 4 is a diagrammatic view of another modification of the present invention.

According to the present invention, an impeller is arranged to deliver air to a diffuser at supersonic velocities, and the diffuser vanes are arranged in spaced relation to the impeller so that a certain amount of diffusion occurs between the impeller and the diffuser vanes. Each of the diffuser vanes is provided with a leading edge directed toward the impeller and having a profile substantially corresponding to a distribution of flow velocities leaving the impeller. Such an arrangement provides for substantially vaneless flow diffusion corresponding to the distribution of flow velocities in the supersonic range and provides for efficient vaned diffusion of the remaining flow at lower velocities. Referring particularly to Fig. 1 of the drawing, it will be seen that an impeller 10 is provided with blades 11 which operate adjacent to a stationary shroud 12 and which are integral with a rotating shroud 13. The blades 11 are provided with extremities 14 from which air flows into a diffuser passage 15 defined by walls 16 and 17. Air passing between the blades of the impeller 10 is forced into the diffuser passage 15 at supersonic velocities which may assume a flow distribution as indicated by a broken line 18. Diffuser vanes 21 fixed between the walls 16 and 17 are provided with leading edge portions 22 having a substantially scalloped or relieved profile which may substantially coincide with the distribution of flow velocities as indicated by the broken line 18. The configuration of this line 18 indicates relatively low velocities adjacent shrouds 12 and 13 at the outlet of the impeller. These lower velocities are caused by boundary layer flow adjacent to the shrouds and diffuser walls, while the higher velocities indicated are near a median location with respect to the impeller shrouds and the diffuser walls 16 and 17. For the purpose of illustration, let us assume that the flow velocity at a median point 19 may be supersonic, while at another median point 20 the velocity may be reduced to substantially sonic value due to progressive diffusion in the passage 15 between the walls 16 and 17. As flow progresses from the median point 20 and is further diffused to a median point 23 at the leading edge of the diffuser vane 21, the median or highest flow velocity is reduced to a subsonic value. Likewise, other velocities of the distributed flow are sufficiently diffused before reaching the relieved profile of the leading edge 22, so that they are also subsonic. Since the velocities adjacent to shrouds 12 and 13 are lower than those near the median point of flow in the passage 15, the flow leaving the impeller 11 at its periphery 14 and adjacent to shrouds 12 and 13 is at a different angle than flow leaving the periphery of the impeller at the median or high velocity flow region. With reference to both Figures 1 and 2 of the drawing, it will be seen that flow as indicated by the arrow A adjacent to the shrouds is at a low velocity and leaves the impeller at a low angle to a line tangent to the periphery thereof. The arrows B and C represent progressively higher velocities toward the median flow region at the periphery of the impeller, all of which substantially dictate the relative angles of the mean camber line of each of the diffuser vanes 21 at various locations along the leading edges thereof, at which flow, corresponding to such velocities, enters the diffuser vanes. As shown in Fig. 1 of the drawing, a point 23 on the leading edge 22 of each vane 21 corresponds to a location at which a flow velocity indicated by arrow C enters the vanes, while similar points 23a and 23b correspond to locations at which flow velocities indicated by the arrows A and B, respectively, enter the diffuser vanes. Thus, the angle of the mean camber line of the vanes at a point 23a corresponds with the angle of the flow velocity indicated by the arrow A. The angle of the mean camber line of the vanes at a point 23b corresponds to the angle of flow velocity as indicated by arrow B while the angle of the mean camber line of the vanes at a point 23 corresponds with the angle of the flow velocities as indicated by the arrow C.

It will be understood that different design conditions may require a variety of configurations of vane leading velocities and their respective distribution and angles as they leave the periphery of the impeller. This arrangement provides all the advantages of vaneless diffusion for supersonic flow and takes particular advantage of vaned diffusion within boundary layer regions for the purpose of diffusing subsonic flow, thereby providing a very efficient transonic flow diffuser. Due to the fact that the leading edge profiles of the diffuser vanes are so arranged, shock between the vanes does not occur since they are relieved where the flow is supersonic. With reference to Fig. 2 of the drawing, it will be seen that the vanes 21 at the subsonic flow region 23 are outside or beyond the diffusion region in which supersonic flow velocities exist. Therefore, compression shock waves S which might occur in conventional vaned diffusers cannot exist in the present diffuser. It is well known in the art that supersonic flow velocities between vanes in a diffuser cause compression shock waves S which disrupt flow to such an extent that efficiency of a diffuser is greatly reduced. The leading edge profiles of the diffuser vanes 21 as shown in Fig. 1 of the drawing provide for diffusion of the boundary layer flow adjacent to the diffuser walls 16 and 17 at a location closer to the outlet of the impeller than would otherwise be accomplished. Thus, the present diffuser provides for flow efficiency, particularly in the boundary layer area. It has been pointed out that the leading edge of each diffuser vane has a median or midpoint 23, which is spaced from the periphery of the impeller beyond the outermost point 20, at which the flow changes from sonic to subsonic velocity and that the leading edges adjacent the side walls 16 and 17 are closer to the periphery of the impeller. The reason for this arrangement is due, as has been explained, to the boundary layers of flow changing to subsonic sooner after leaving the impeller than the flow near the median line of the diffuser passage. As illustrated, the point 23 is spaced from the points where the leading edge converges with the walls 16 and 17 a greater distance than the walls are spaced. This relation will be maintained throughout changes in the sizes and capacities of the compressors embodying the invention.

In the modification of the present invention as shown diagrammatically in Fig. 3 of the drawing, it is assumed that the distribution of flow velocities from an impeller 24 may be as indicated by a broken line 25 which graphically illustrates a condition wherein flow velocities are not highest at a median location within the impeller outlet. Such an impeller having a slanted distribution of flow velocities may be accompanied by cooperating diffuser vanes 26 having slanted leading edge profiles 27 arranged to be substantially parallel to, or coincide with, the distribution of flow velocities from the impeller.

Referring to Fig. 4 of the drawing, it will be seen that an impeller 28 is provided with cooperative diffuser sections having vanes 29 which are completely relieved throughout their length at a median location between the walls of the diffuser passage. The diffuser vanes 29 therefore diffuse flow adjacent to the flow passage walls and permit vaneless diffusion at a median flow region therebetween. These vanes 29 prevent boundary layer flow from travelling around the walls of the diffuser and thus force such boundary layer flow to travel more nearly in the direction of the higher velocity flow passing through the median relief portion of the diffuser vanes 29. Boundary layer friction losses on the diffuser walls are thus minimized.

This diffuser is particularly useful for diffusion at supersonic flow of high Mach numbers.

It will be understood that the diffuser arrangements, while presently disclosed in cooperative relation with compressors, may be utilized for diffusing flow delivered by other devices and ranging from supersonic to subsonic velocities.

It will be understood that various modifications of the present invention may be resorted to in a manner limited only by a just interpretation of the following claims.

We claim:

1. In a centrifugal compressor of the type having an impeller: a diffuser comprising a pair of walls spaced to define a flow passage for receiving fluid discharged at a supersonic rate by said impeller; and diffuser vanes disposed between said walls, said vanes having leading edge portions all points on which are disposed in spaced relation from the impeller at least the distance required by the fluid discharge to decrease to a subsonic rate of flow, said leading edges being shaped to correspond substantially to a pattern extending transversely of said flow passage established by points at which the rate of fluid flow from the impeller decreases from supersonic to subsonic.

2. In a centrifugal compressor of the type having an impeller operative to discharge fluid at a supersonic rate: diffuser means having a pair of walls spaced axially of the impeller to define a flow passage for receiving the fluid discharged by said impeller; and diffuser vanes disposed between said walls, said vanes having leading edge portions all points on which are spaced from the impeller beyond the point of transition of the velocity of the fluid discharge from supersonic to subsonic, said leading edges being shaped to correspond substantially to a pattern extending transversely of said flow passage established by the points at which such transition takes place, said vanes curving longitudinally away from a plane substantially tangent to said impeller in the general direction of rotation thereof.

3. In a compressor, an impeller for centrifugally discharging fluid at velocities in excess of subsonic; a diffuser at the periphery of said impeller, said diffuser having walls disposed in spaced relation to receive fluid discharged by said impeller; and diffuser vanes extending transversely between said walls, said vanes having a leading edge contour disposed adjacent and corresponding substantially to a row of points of transition of fluid velocities from sonic to subsonic, each vane extending away from said impeller at an angle to a plane projecting radially from the axis of rotation of said impeller, the portions of each vane adjacent the leading edge thereof being substantially parallel with the direction of flow of fluid engaging such leading edge.

4. In a centrifugal compressor of the type having an impeller operative to discharge fluid at a supersonic rate: diffuser means having a pair of walls spaced axially of the impeller to define a flow passage for receiving fluid discharged by the impeller, said walls tending to cause drag on the fluid discharge and decrease the velocity thereof adjacent said walls to subsonic while the velocity of fluid inwardly of said walls remains supersonic with a transition curve pattern extending transversely of said flow passage being established by the points at which transition of the velocity from supersonic to subsonic takes place; and diffuser vanes positioned between said walls, said vanes having leading edges closely adjacent said pattern and facing the impeller, each of said leading edges having portions adjacent said walls located in closer relationship to said impeller than the portions inwardly of said walls, all portions of the leading edges of said vanes being located in regions wherein the flow velocity has been reduced below sonic, the portions of said leading edges adjacent said walls being located in closer relationship to said impeller than the center of said pattern.

References Cited in the file of this patent

UNITED STATES PATENTS

| | | |
|---|---|---|
| 353,994 | Walker | Dec. 7, 1886 |
| 1,291,037 | Lole | Jan. 14, 1919 |
| 2,114,285 | Berger | Apr. 19, 1938 |

FOREIGN PATENTS

| | | |
|---|---|---|
| 530,640 | France | Oct. 6, 1921 |
| 579,770 | Great Britain | Aug. 15, 1946 |
| 583,664 | Great Britain | Dec. 24, 1946 |
| 636,290 | Great Britain | Apr. 26, 1950 |
| 724,553 | Germany | Aug. 29, 1942 |

UNITED STATES PATENT OFFICE
CERTIFICATION OF CORRECTION

Patent No. 2,967,013                      January 3, 1961

Frederick Dallenbach et al.

It is hereby certified that error appears in the above numbered patent requiring correction and that the said Letters Patent should read as corrected below.

Column 2, line 59, after "vane leading" insert -- edge structure to substantially correspond with flow --; column 3, line 54, for "at" read -- of --; line 55, for "of" read -- at --.

Signed and sealed this 18th day of July 1961.

(SEAL)
Attest:

ERNEST W. SWIDER                      DAVID L. LADD
Attesting Officer                      Commissioner of Patents